US010855678B2

(12) United States Patent
Merrell

(10) Patent No.: US 10,855,678 B2
(45) Date of Patent: Dec. 1, 2020

(54) TEMPORARY BIOMETRIC TEMPLATES FOR MAINTAINING A USER AUTHENTICATED STATE

(71) Applicant: Motorola Mobility LLC, Chicago, IL (US)

(72) Inventor: Thomas Yates Merrell, St. Charles, IL (US)

(73) Assignee: Motorola Mobility LLC, Chicago, IL (US)

( * ) Notice: Subject to any disclaimer, the term of this patent is extended or adjusted under 35 U.S.C. 154(b) by 144 days.

(21) Appl. No.: 16/057,520

(22) Filed: Aug. 7, 2018

(65) Prior Publication Data

US 2020/0053077 A1    Feb. 13, 2020

(51) Int. Cl.
*H04L 29/06*     (2006.01)
*G06Q 20/40*     (2012.01)
*H04L 9/32*      (2006.01)

(52) U.S. Cl.
CPC ... *H04L 63/0861* (2013.01); *G06Q 20/40145* (2013.01); *H04L 9/3228* (2013.01)

(58) Field of Classification Search
CPC ............ G06Q 20/40145; H04L 63/0861
USPC ........................................................ 713/186
See application file for complete search history.

(56) References Cited

U.S. PATENT DOCUMENTS

| 10,146,988 | B2 * | 12/2018 | Mankowski | ....... G06K 9/00033 |
| 2014/0282945 | A1 * | 9/2014 | Smith | ..................... G06F 21/78 726/6 |
| 2018/0364813 | A1 * | 12/2018 | Sayah | .................. G06F 3/0304 |

OTHER PUBLICATIONS

Kawamata,"Student Authentication by Updated Facial Information with Weighting Coefficient in e-Learning", Nov. 2016, pp. 551-555.

* cited by examiner

*Primary Examiner* — Anthony D Brown
(74) *Attorney, Agent, or Firm* — SBMC

(57) ABSTRACT

Temporary biometric templates for maintaining a user authenticated state are described herein. In some implementation, an electronic device receives an input to unlock using a first secure authentication technique to initiate a current unlock session. A temporary biometric template of a biometric feature of a user unlocking the electronic device is created effective to initiate a user authenticated state. The biometric feature of the user associated with the temporary biometric template is tracked during the current unlock session. The user authenticated state is maintained based on a comparison of the tracked biometric feature of the user with the biometric feature of the temporary biometric template. When the biometric feature of the user can no longer be tracked, the user authenticated state is terminated and the temporary biometric template is invalidated.

20 Claims, 4 Drawing Sheets

TEMPORARY BIOMETRIC TEMPLATES FOR MAINTAINING A USER AUTHENTICATED STATE

BACKGROUND

Biometric templates such as facial templates can be used to recognize and authenticate a user. After an initial enrollment, current facial template techniques build up a single template over time, creating a master template or super template. The intent with this single template is that it will be successful under all conditions. Such techniques result in weaker templates over time as data that is not statistically significant or biometrically unique is added to the template, such as a facial expression (smiling, frowning, blinking, etc.), accessories (glasses, hats, piercings, etc.), and style changes (facial hair, makeup, etc.), to name just a few. In order for the single, super template to accommodate these changes, a so-called matching threshold must be reduced. The matching threshold is the threshold that determines whether a captured face is considered a match or not. Reducing the matching threshold increases the false accept rate (FAR) of a matching algorithm. This results in the template more easily matching with people who look similar to a user, such as a sibling, a parent, or child. Traditional facial recognition templates create a problem of two competing goals. On the one hand, the template has to be "forgiving enough" to accommodate a user's changing looks due to expression, accessories, and style, but on the other hand, it must be strict enough to distinguish between similar looking individuals such as siblings, parents, and children. Challenges continue to be posed to those who develop template-based technology.

BRIEF DESCRIPTION OF THE DRAWINGS

Implementations of temporary biometric templates for maintaining a user authenticated state are described with reference to the following Figures. The same numbers may be used throughout to reference similar features and components shown in the Figures.

DETAILED DESCRIPTION

Figure 1:
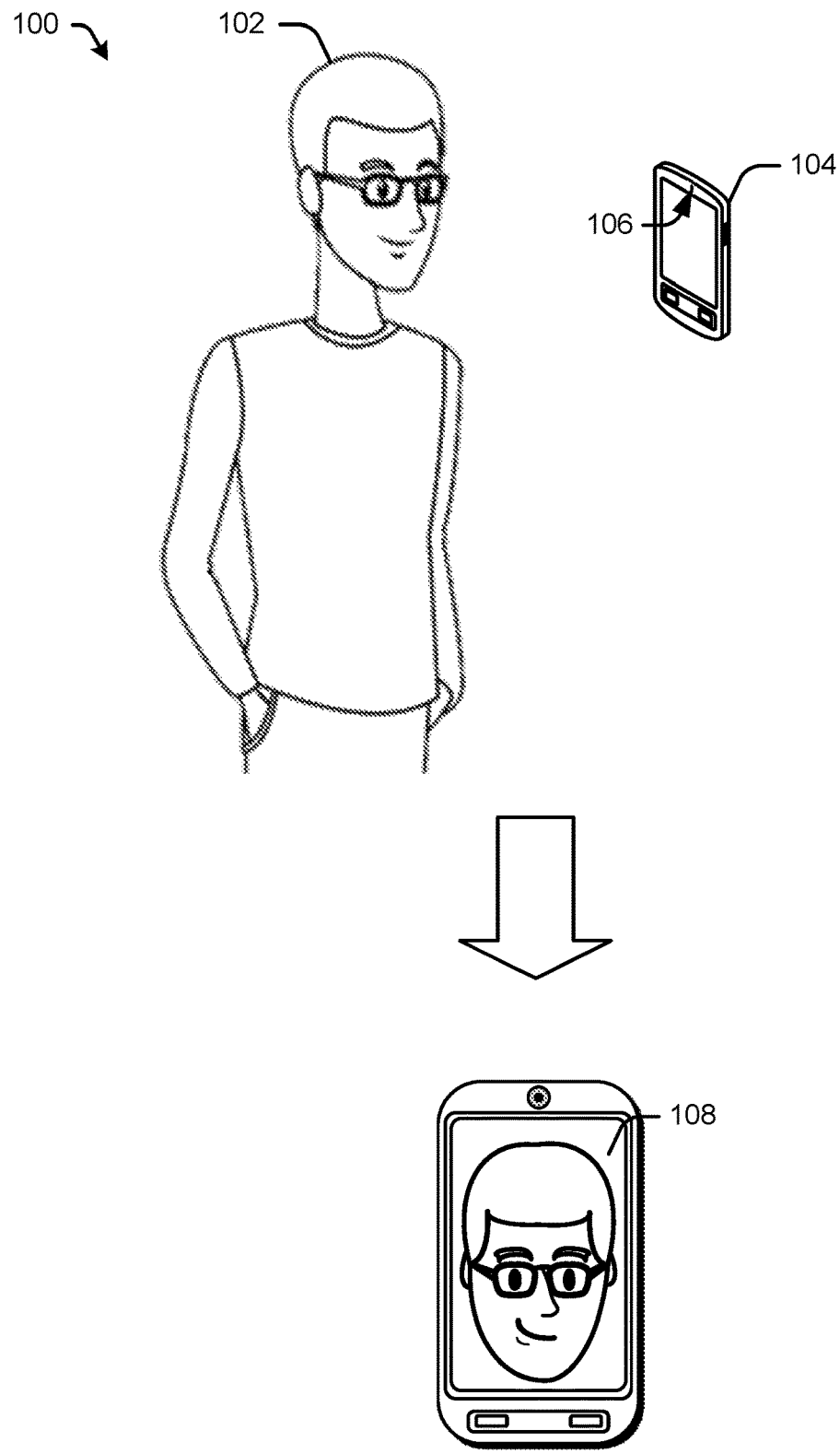
FIG. 1 illustrates an example environment of temporary biometric templates for maintaining a user authenticated state as described herein.

Various implementations of temporary biometric templates for maintaining a user authenticated state are described. In one implementation, an electronic device is unlocked using a first secure authentication method, such as a password or PIN, a fingerprint, or an iris scan. A temporary biometric template of a biometric feature of a user is created, a user authenticated state is initiated, the biometric feature of the user is continuously tracked, the biometric feature of the user is continually compared to the temporary biometric template, the biometric feature data is added to the temporary biometric template when the tracked biometric feature matches the temporary biometric template to a predetermined threshold level, and the user authenticated state is maintained as long as the biometric feature of the user matches the temporary biometric template to a predetermined threshold. If the tracked biometric feature no longer matches the biometric template to the predetermined threshold level, the user authenticated state is terminated. When the feature of the user can no longer be tracked, the temporary biometric template is invalidated.

For example, when a user unlocks their electronic device with a password, a camera on the electronic device can capture a facial image of the user and create a temporary facial template. The electronic device can then track the user's face with the camera and with some frequency continually compare it to the temporary facial template. As long as the comparison meets the predetermined match threshold level, a user authenticated state is maintained. With each comparison made that meets the predetermined match threshold level, data from the tracked face can be added to the temporary template, allowing for greater flexibility while still ensuring a high match threshold level. For example, if a user begins to tilt or turn their head, the continuous tracking, matching, and template updating ensure that the user is still the user to a high threshold level while at the same time allowing greater flexibility than that of a super template that requires a user to look directly into the camera with zero head tilt in order to be effective. Once the user leaves the camera's field of view or moves too far away from the camera such that the user's face no longer matches the temporary facial template to the high threshold level, the user authenticated state is terminated. If the user's face can no longer be tracked, then the temporary facial template is invalidated. In at least some implementations, the temporary facial template is only valid for the duration that the electronic device trusts that the user's face is the same one represented by the temporary facial template. For example, if a user turns completely around, their face is obscured, or their face is no longer in view of the electronic device's camera, the user authenticated state is terminated and the temporary facial template invalidated. However, as long as the user's face is in view, even if the face is tilted or turned somewhat, and can be matched to the temporary facial template, the user authenticated state can be maintained. This is an advantage over super templates that require a user to look directly at the camera in the electronic device, be centered, and have no head tilt in order to maintain a high authentication reliability and security.

Face tracking alone is not enough to maintain a user authenticated state using temporary biometric templates. It is important to use facial authentication techniques to build a face signature to better ensure that the user is still the same authenticated user. This allows the face recognition algorithm to use a higher threshold by default, thus allowing for better rejection of people who look similar to the user, such as siblings, parents, or children.

Temporary biometric templates are described herein primarily with respect to facial templates and facial recognition. However, this is by way of example and not limitation. Temporary biometric templates can also be used for voice recognition, heartbeat patterns, the way a person walks, a person's breath, or any other type of biorhythm, and other biometrics. In addition, any combination of these may also be used to authenticate a user with temporary biometric templates. For example, both a user's face and voice may be used to build a temporary biometric template.

In addition, temporary biometric templates for maintaining a user authenticated state can be used not only with a single electronic device, but also with a system of devices. Take for example a smart home where a user's home assistant works in conjunction with the user's mobile phone, television, and any other electronic devices they may have. A user may initially log into their system with their mobile phone using a password, but wish to purchase a movie using their television. As long as a temporary facial template is created when the user logs in, the user's face is continuously tracked by at least one of the devices in the system and the comparison of the user's face with the temporary facial template matches to a high predetermined threshold level, a user authenticated state can be maintained, and the user may purchase the movie from their television.

A temporary facial template can provide for a very high facial recognition match threshold as well as provide for flexibility when it comes to a user's changing looks over time. This is because the temporary facial template does not need to account for all possible facial variations of a user. Rather, the template only needs to match the user's face during a particular session, e.g., an unlock session where the device is unlocked. It does not matter then, that a user may not have shaved or is wearing their glasses instead of contact lenses at a particular time. The temporary facial template only needs to be trusted until the electronic device is locked or until the user does something that causes the template to invalidate, such as leave the field of view of the camera or move too far away from the camera.

Take for example a user that currently has a black eye, or whose face is swollen and discolored. Traditional methods of facial recognition might reject this user because their face does not match their super template. But, by using a temporary facial template, this is not a problem because the template only needs to match the user's face during the time when the user has the black eye. Once their black eye is gone, so is the temporary facial template associated with the black eye. This same type of scenario can be applied to other temporary biometric templates such as voice, where a user's voice is temporarily changed due to a cold.

The above-described two-step authentication process makes it possible for the temporary biometric templates to have both a very high match threshold and a high amount of flexibility to encompass a user's changing looks. So, for example, the user may input a fingerprint, password or some other kind of well-known, trusted, secure authentication to unlock an electronic device. As the user inputs their password, a quick enrollment of a biometric feature of that user is done by capturing their image, for example, in the moment while they are unlocking their device, and a temporary facial template is created that has a very high match threshold. The user's face is then tracked and a continual comparison made between the temporary facial template and the user's tracked face. If the user's tracked face matches the temporary template to a predetermined threshold level, the new facial data is added to the temporary template. In this way, a user authenticated state is maintained, and as long as the user authenticated state is maintained, the user may request and complete any number of various interactions with the electronic device without being required to authenticate again using a fingerprint or password. For example, temporary biometric templates may be used to access and permit user interactions with a user's email, texts, pictures, and social media accounts. In addition, temporary biometric templates may be used for any kind of sensitive online user interaction, such as interactions that involve a user's medical information, legal information, and financial information to name a few. For example, a user may make an online purchase using their electronic device without being required to input a password to make the purchase as long as the authenticated state is maintained.

The continuous nature of the user authenticated state and the ability to set the match threshold very high, makes financial transactions and other sensitive online interactions such as those mentioned above, much easier and smoother, while at the same time keeping them very secure. For example, when a user unlocks their electronic device using a PIN or password, the electronic device can create a temporary facial template, track the user's face and with some frequency, continually compare the user's tracked face to the temporary facial template, adding new facial data when matched to a predetermined threshold level, to maintain a user authenticated state. The user can now use an application executing on the electronic device to complete some kind of sensitive online interaction, for example a financial transaction, like a personal banking transaction, or a purchase from an online vendor. When the user attempts the financial transaction, the user's tracked face is compared to the temporary facial template, and when matched to a predetermined threshold level, the financial transaction is permitted. By using the temporary facial template to maintain a user authenticated state, the user does not have to re-enter a password or PIN for each financial transaction, as long as the user's face is still tracked and matches the temporary facial template to a previously defined threshold level. This makes for a simple yet extremely secure interaction. If the user's face can no longer be tracked, the user authenticated state is terminated and the temporary facial template invalidated. If, at this point, the user wishes to make another financial transaction, they will have to re-authenticate using the initial PIN or password, at which time a new temporary facial template will be created, the user's face will be tracked, and a new user authenticated state initiated.

While implementations of temporary biometric templates for maintaining a user authenticated state primarily provide for a biometric template that only lasts for a current unlock session by a user, alternately or in addition, the temporary biometric templates can be used for longer than a single unlock session. For example, when a user initially unlocks an electronic device with a password, the previous temporary biometric template can be checked and if it matches with the user's current image to a high predetermined threshold level, that previous template can be added to and used again. Take, for example, a situation where it has been only two minutes since the last time a user unlocked their phone. Most likely the user's face has not changed and the previous temporary facial template would still match to a very high threshold. In this case, it would not be necessary to create a new temporary facial template, as the previous one will work to a very high degree of accuracy.

While features and concepts of temporary biometric templates for maintaining a user authenticated state can be implemented in any number of different devices, systems, environments, and/or configurations, implementations of temporary biometric templates are described in the context of the following example devices, systems, and methods.

FIG. 1 illustrates an example operating environment 100 in accordance with one or more implementations. Environment 100 includes a user 102 and a mobile device 104. In the upper portion of FIG. 1, user 102 is engaged with a front-facing camera 106 of the mobile device that captures a facial image to use for creating a temporary facial template and additionally, is used for tracking the user 102. The temporary facial template as captured by the camera 106 of the mobile device 104 is shown on the mobile device's display screen 108 in the lower portion of FIG. 1. In addition to capturing the temporary facial template, the camera 106 is also used for tracking the user 102. Generally, the mobile device 104 is an electronic computing device implemented with various components, such as a camera, processing system and memory, as well as any number and combination of different components as further described with reference to the example electronic device shown in FIG. 4.

FIG. 1 shows the camera 106 tracking the face of the user 102 straight on, however, it is not necessary for the user to be looking directly into the camera to maintain the user authenticated state. The user may be looking up or down or to the side, such that only the user's profile is in view of the camera 106. As long as the user's face is in view of the camera and can be tracked, and the user's face matches the temporary facial template to a predetermined threshold level, regardless of tilt or angle, a user authenticated state can be maintained. However, if the user turns completely around such that their face is no longer in view of the camera, the user authenticated state will be terminated and the temporary facial template may be invalidated.

Example methods 200 and 300 are described with reference to respective FIGS. 2 and 3 in accordance with one or more example implementations of temporary biometric templates for maintaining a user authenticated state. Generally, any of the components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
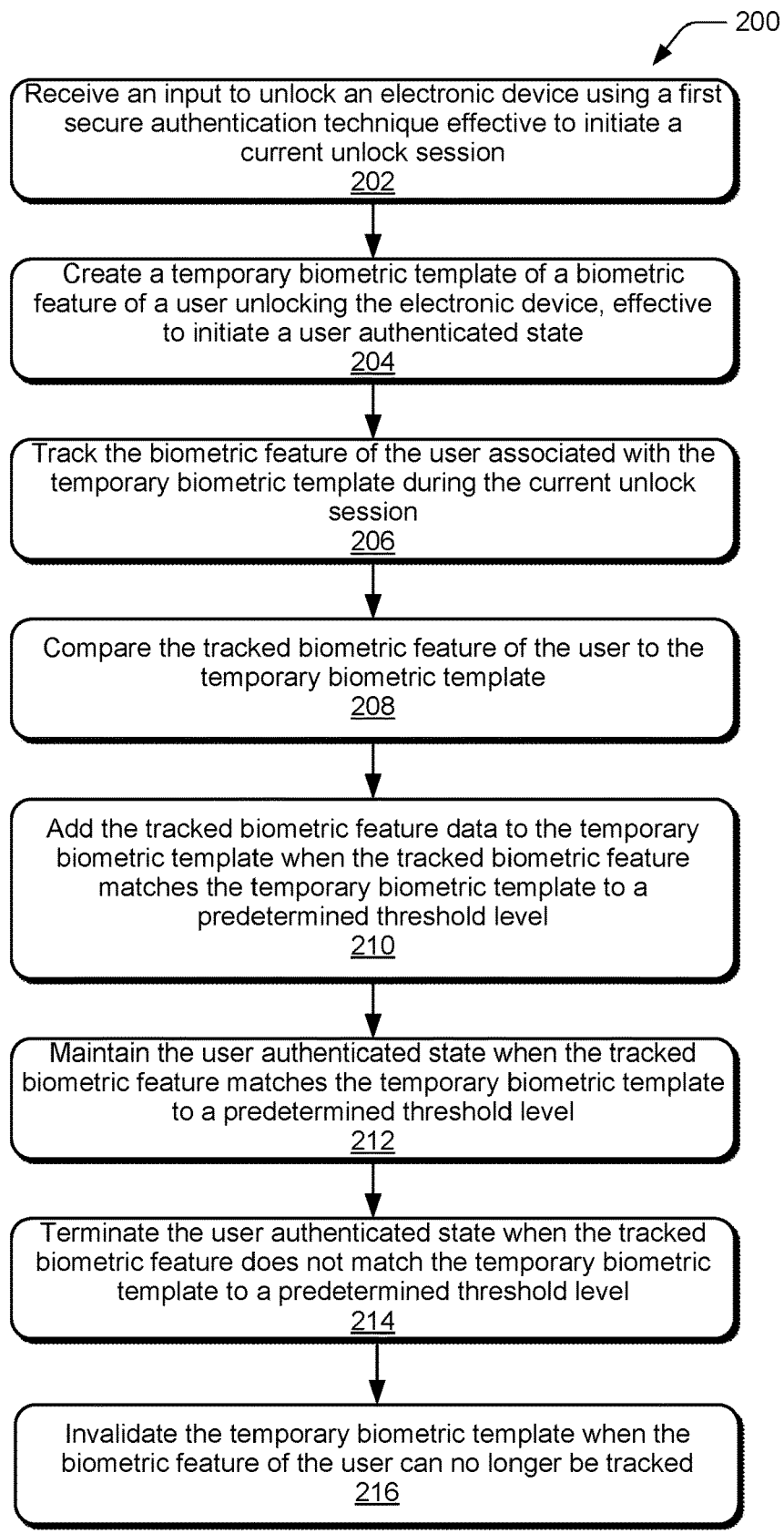
FIG. 2 illustrates an example method of temporary biometric templates for maintaining a user authenticated state in accordance with one or more implementations of the techniques described herein.

FIG. 2 illustrates an example method 200 of temporary biometric templates for maintaining a user authenticated state. The order in which the method is described is not intended to be construed as a limitation, and any number or combination of the described method operations can be performed in any order to perform a method, or an alternate method.

At 202, an electronic device receives an input to unlock using a first secure authentication technique effective to initiate a current unlock session. The first secure authentication technique is a well-known user authentication technique such as a password, PIN, an iris scan, or a fingerprint scan. Once the electronic device is unlocked, a current unlock session is initiated.

At 204, a temporary biometric template of a biometric feature of a user unlocking the electronic device is created effective to initiate a user authenticated state. For example, during the first user input to unlock the electronic device, a facial image is captured by the electronic device's camera and used to create the temporary biometric template. Once the temporary biometric template is created, a user authenticated state begins.

At 206, the biometric feature of the user associated with the temporary biometric template is tracked during the current unlock session. A camera such as the camera 106 of FIG. 1 can be used to track the biometric feature, such as the face of the user. Other techniques can, of course, be used.

At 208, the tracked biometric feature of the user is compared to the temporary biometric template. For example, a user's face is continuously tracked and with some frequency, continually compared to a temporary facial template.

At 210, when the tracked biometric feature matches the temporary biometric template to predetermined threshold level, the biometric data of the tracked biometric feature is added to the temporary biometric template. This feature allows for temporary biometric templates that provide for increased flexibility while maintaining a very high level of security.

At 212, the user authenticated state is maintained when the tracked biometric feature matches the temporary biometric template to a predetermined threshold level. That is, as long as the camera 106 continuously tracks the face of the user, and the face of the user continually matches the temporary facial template to a predetermined threshold level, the user authenticated state is maintained.

At 214, the user authenticated state is terminated when the tracked biometric feature does not match the temporary biometric template to a predetermined threshold level. For example, if the user looks up at the ceiling and not enough of the user's face is visible to the camera 106 to match the temporary facial template to a predetermined threshold, the user authenticate state is terminated. In some implementation, if the user's face does not match to the predetermined high threshold level, because for example, they are looking at the ceiling, but the face is still tracked and the current unlock session maintained, the user can still be authenticated with the temporary facial template once their face is turned towards the camera enough to match the temporary facial template to the predetermined high threshold level.

At 216, the temporary biometric template is invalidated when the biometric feature of the user can no longer be tracked. For example, if the user moves out of the field of view of the camera in the electronic device, their face is obscured, or the user turns completely around and their face cannot be tracked, the temporary biometric template is invalidated.

Figure 3:
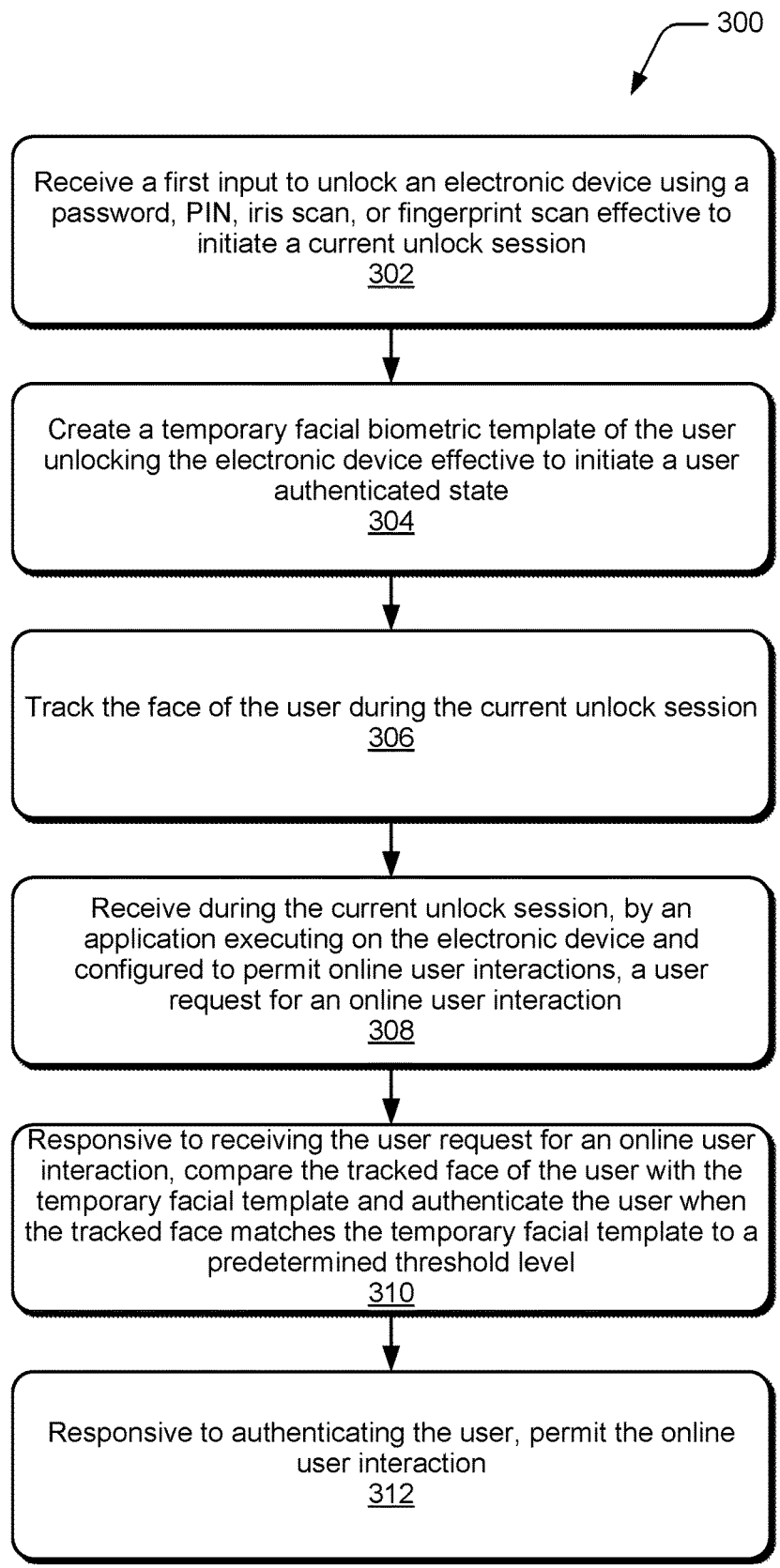
FIG. 3 illustrates an example method of temporary biometric templates for maintaining a user authenticated state in accordance with one or more implementations of the techniques described herein.

FIG. 3 illustrates an example method 300 of a user attempting an online user interaction on an electronic device that supports temporary biometric templates for maintaining a user authenticated state.

At 302, an electronic device receives a first input such as a password, PIN, iris scan, or a fingerprint scan to unlock the electronic device effective to initiate a current unlock session. This initial user authentication is the first in a two-step process of maintaining a user authenticated state using temporary biometric templates. The first input unlocks the device and initiates a current unlock session.

At 304, a temporary facial biometric template of the user unlocking the electronic device is created effective to initiate a user authenticated state. As the user inputs the initial password, PIN, iris or fingerprint scan, a camera such as camera 106 in FIG. 1, captures a facial image of the user to create a temporary biometric facial template, thus beginning the user authenticated state.

At 306, the face of the user is tracked during the current unlock session. For example, the camera 106 in FIG. 1 continuously tracks the user's face. If the user moves out of the field of view of the camera, moves too far away, or turns all the way around, the user's face can no longer be tracked and the authenticated state will terminate. As long as the user's face is able to be tracked and their face matches that of the temporary facial template, regardless of head tilt or angle, the user authenticated state can be maintained.

At 308, during the current unlock session, a user request for an online user interaction is received by an application executing on the electronic device and configured to permit online user interactions. For example, the user may wish to purchase a product from an online vendor. Accordingly, the user may choose the product, place the product in their virtual cart and proceed to checkout.

At 310, responsive to receiving the user request for an online user interaction, the tracked face of the user is compared with the temporary facial template and the user is authenticated when the tracked face matches the temporary facial template to a predetermined high threshold level. In some implementations, if the user's face does not match to the predetermined high threshold level, because for example, their face is turned too far to the side for the camera to see accurately, but the face is still tracked and the current unlock session maintained, the user can still be authenticated with the temporary facial template once their face is turned towards the camera enough to match the temporary facial template to the predetermined high threshold level.

At 312, responsive to authenticating the user, the online user interaction is permitted. At this point, the user may successfully complete an online user interaction. For example, the user may checkout and complete their purchase with the online vendor. In addition, they may be permitted to make as many user interactions as they want as long as the user authenticated state is maintained.

Figure 4:
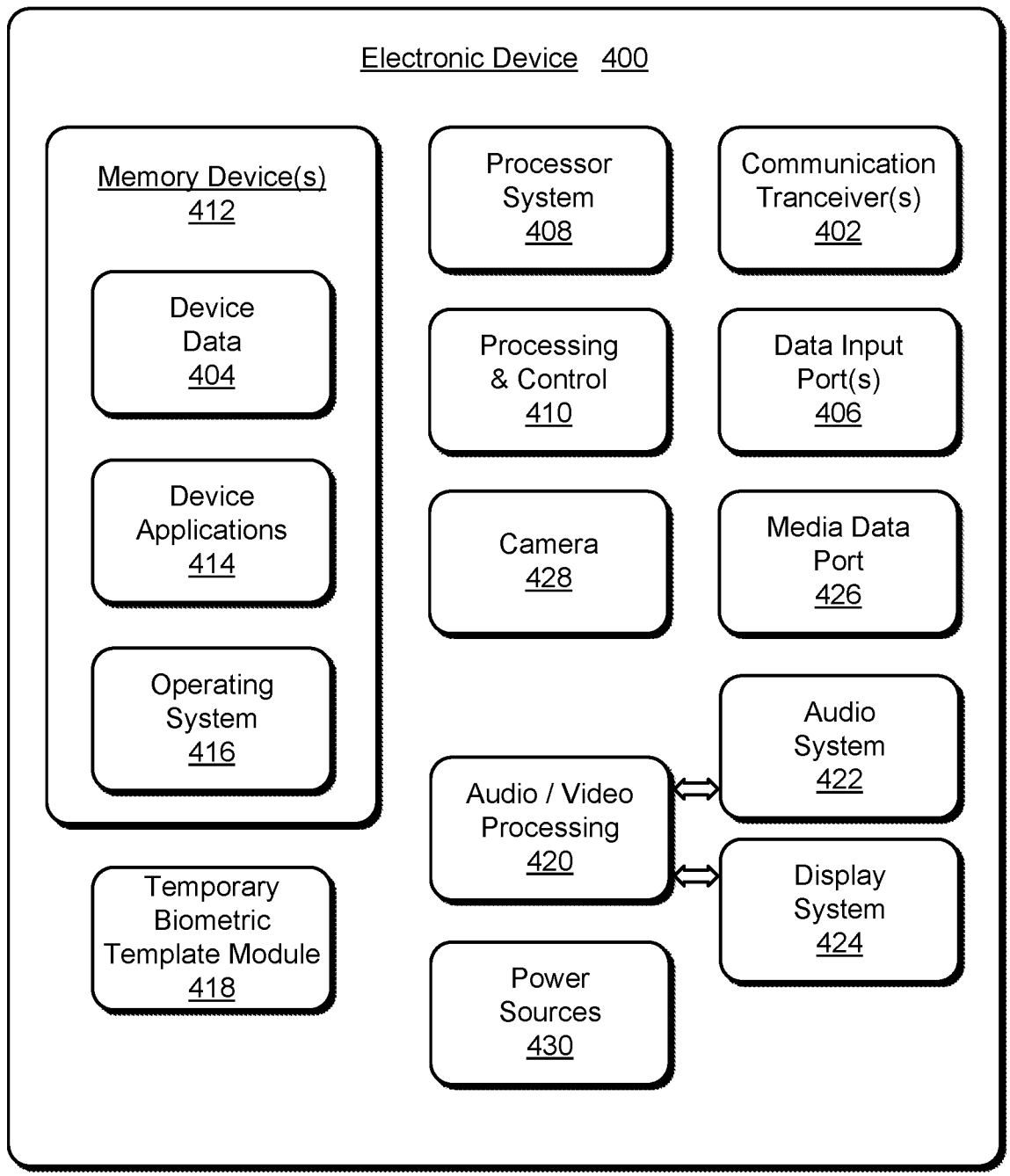
FIG. 4 illustrates various components of an example electronic device that can implement aspects of temporary biometric templates for maintaining a user authenticated state in accordance with one or more implementations of the techniques described herein.

FIG. 4 illustrates various components of an example electronic device 400, which can implement examples of temporary biometric templates for maintaining a user authenticated state. The example electronic device 400 can be implemented as any suitable type of electronic device described with reference to the previous FIGS. 1-3, such as any type of mobile device, mobile phone, client device, wearable device, tablet, computing communication, entertainment, gaming, media playback, and/or other type of electronic device. For example, the mobile device 104 in FIG. 1 may be implemented as the example electronic device 400.

The electronic device 400 includes communication transceivers 402 that enable wired and/or wireless communication of device data 404 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The electronic device 400 may also include one or more data input ports 406 via which any type of data, media content, and/or inputs can be received, such as user-selectable inputs to the device, messages, music, television content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The electronic device 400 includes a processor system 408 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 410. The electronic device 400 may further include any type of a system bus or other data and command transfer system that couples the various components within the device. A system bus can include any one or combination of different bus structures and architectures, as well as control and data lines.

The electronic device 400 also includes one or more memory devices 412 that enables data storage, such as data storage devices that can be accessed by a computing device, and that provide persistent storage of data and executable instructions (e.g., software applications, programs, algorithms, functions, and the like). Examples of memory devices 412 include volatile memory and non-volatile memory, fixed and removable media devices, and any suitable memory device or electronic data storage that maintains data for computing device access. The memory devices can include various implementations of random access memory (RAM), read-only memory (ROM), flash memory, and other types of storage memory devices in various memory device configurations. The device 400 may also include a mass storage media device.

The memory devices 412 provide data storage mechanisms to store the device data 404, other types of information and/or data, and various device applications 414 (e.g., software applications). For example, an operating system 416 can be maintained as software instructions with a memory device and executed by the processor system 408. The electronic device applications may also include a device manager, such as any form of a control application, software application, signal-processing and control module, code that is native to a particular device, a hardware abstraction layer for a particular device, and so on.

In this example, the device 400 includes a temporary biometric template module 418 that implements features and aspects of temporary biometric templates for maintaining a user authenticated state, such as when the device 400 is implemented as the mobile device 104 described with reference to FIG. 1. In implementations, the temporary biometric template module 418 may include independent processing, memory, and logic components as a computing and/or electronic device integrated with the example device 400.

The electronic device 400 also includes an audio and/or video processing system 420 that generates audio data for an audio system 422 and/or generates display data for a display system 424. An example of the display system 424 is the display screen 108 of the mobile device 104 in FIG. 1. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 426. In implementations, the audio system and/or the display system are integrated components of the example device. Alternatively, the audio system and/or the display system are external, peripheral components to the example device.

The electronic device 400 also includes a camera 428 that enables image capture of scenes external to the electronic device, such as when the electronic device is implemented as the example device 104 that includes a camera 106 as shown in FIG. 1. The camera 428 may be employed to capture the image of a face of a user to assist in the creation of a temporary facial template. In addition, the camera 428 may be used to tack the face of a user to assist in maintaining a user authenticated state.

The electronic device 400 can also include one or more power sources 430, such as when the device is implemented as a mobile device. The power sources may include a charging and/or power system, and can be implemented as a flexible strip battery, a rechargeable battery, a charged super-capacitor, and/or any other type of active or passive power source.

Although implementations of temporary biometric templates for maintaining a user authenticated state have been described in language specific to features and/or methods, the subject of the appended claims is not necessarily limited to the specific features or methods described. Rather, the specific features and methods are disclosed as example implementations of temporary biometric templates for maintaining a user authenticated state, and other equivalent features and methods are intended to be within the scope of the appended claims. Further, various different examples are described and it is to be appreciated that each described example can be implemented independently or in connection with one or more other described examples.

The invention claimed is:

1. A method for using biometric templates to maintain a user authenticated state, the method comprising:
   receiving, by an electronic device, an input to unlock the electronic device using a first secure authentication technique effective to initiate a current unlock session;
   creating, by the electronic device, a temporary biometric template of a biometric feature of the user unlocking the electronic device, effective to initiate a user authenticated state;
   tracking, by the electronic device, the biometric feature of the user associated with the temporary biometric template for a duration of the current unlock session;
   comparing, by the electronic device, the tracked biometric feature of the user to the temporary biometric template, the first secure authentication technique being different than the biometric feature;
   updating, by the electronic device, the temporary biometric template by continuously adding, while in the user authenticated state, biometric feature data to the temporary biometric template when the tracked biometric feature matches the temporary biometric template to a predetermined threshold level;
   maintaining, by the electronic device, the user authenticated state when the tracked biometric feature matches the temporary biometric template to a predetermined threshold level;
   terminating, by the electronic device, the user authenticated state when the biometric feature does not match the temporary biometric template to a predetermined threshold level; and
   invalidating, by the electronic device, the temporary biometric template when the biometric feature of the user can no longer be tracked.

2. The method as recited in claim 1, wherein the biometric feature of the temporary biometric template is a facial image capture.

3. The method as recited in claim 1, wherein the biometric feature of the temporary biometric template is a voice sample capture.

4. The method as recited in claim 1, wherein said creating a temporary biometric template comprises using more than one biometric feature to create the temporary biometric template.

5. The method as recited in claim 1, wherein said creating a temporary biometric template comprises using both a facial image capture and a voice sample capture to create the temporary biometric template.

6. The method as recited in claim 1, wherein the first secure authentication technique is at least one of a password, PIN, an iris scan, or a fingerprint scan, and the biometric feature of the temporary biometric template is a facial image capture.

7. The method as recited in claim 1 further comprising:
   receiving, by an application executing on the electronic device during the current unlock session, a request for a user interaction;
   responsive to receiving the request for the user interaction, authenticating the user using a temporary facial template; and
   responsive to authenticating the user, permitting the user interaction with the application.

8. The method as recited in claim 7, wherein the application is configured to permit financial transactions.

9. A method for using biometric templates to authenticate a user for an online user interaction, the method comprising:
   receiving, by an electronic device, a first input to unlock the electronic device using at least one of a password, PIN, an iris scan, or a fingerprint scan effective to initiate a current unlock session;
   creating, by the electronic device, a temporary facial template of the user unlocking the electronic device, the temporary facial template effective to initiate a user authenticated state;
   tracking, by the electronic device, the face of the user for a duration of the current unlock session;
   updating, by the electronic device, the temporary facial template by continuously adding, while in the user authenticated state, facial feature data to the temporary facial template;
   receiving, by the electronic device, during the current unlock session, by an application executing on the electronic device and configured to permit the online user interaction, a user request for an online user interaction;
   responsive to receiving the user request for an online user interaction, comparing, by the electronic device, the tracked face of the user with the temporary facial template and authenticating the user when the tracked face matches the temporary facial template to a predetermined threshold level; and
   responsive to authenticating the user, permitting, by the electronic device, the online user interaction.

10. The method as recited in claim 9 further comprising receiving a second user request for an online user interaction and comparing the tracked face with the temporary facial template, and authenticating the user when the tracked face matches the temporary biometric template to a predetermined threshold level.

11. The method as recited in claim 9 further comprising terminating the user authenticated state when the electronic device is locked, the face of the user can no longer be tracked, or the comparison between the temporary facial template and the tracked face no longer matches to the predetermined threshold level.

12. An electronic device, comprising:
a temporary biometric template module implemented to:
receive an input to unlock the electronic device using a first secure authentication technique effective to initiate a current unlock session;
create a temporary biometric template of a biometric feature of a user unlocking the electronic device effective to initiate a user authenticated state;
track the biometric feature of the user associated with the temporary biometric template for a duration of the current unlock session;
compare the tracked biometric feature of the user to the temporary biometric template, the first secure authentication technique being different than the biometric feature;
update the temporary biometric template by continuously adding, while in the user authenticated state, the biometric feature data to the temporary biometric template when the tracked biometric feature matches the temporary biometric template to a predetermined threshold level;
maintain the user authenticated state when the tracked biometric feature matches the temporary biometric template to the predetermined threshold level; and
terminate the user authenticated state when the biometric feature of the user can no longer be tracked, said terminating causing the temporary biometric template to be invalidated.

13. The electronic device as recited in claim 12, wherein the temporary biometric template module is implemented to capture a facial image for the biometric feature of the temporary biometric template.

14. The electronic device as recited in claim 12, wherein the temporary biometric template module is implemented to capture a voice sample for the biometric feature of the temporary biometric template.

15. The electronic device as recited in claim 12, wherein the temporary biometric template module is implemented to capture more than one biometric feature to create the temporary biometric template.

16. The electronic device as recited in claim 12, wherein the temporary biometric template module is implemented to capture a facial image and a voice sample to create a temporary biometric template.

17. The electronic device as recited in claim 12, wherein the first secure authentication technique is at least one of a password, PIN, an iris scan, or a fingerprint scan, and the biometric feature of the temporary biometric template is a facial image capture.

18. The electronic device as recited in claim 12, further configured to:
receive, by an application executing on the electronic device during the current unlock session, a request for a user interaction;
authenticate, by the temporary biometric template module, the user using the temporary biometric template; and
responsive to authenticating the user, permit the user interaction with the application.

19. The electronic device as recited in claim 18 wherein the application is configured to permit financial transactions.

20. The electronic device as recited in claim 18, wherein the application is a banking application.

* * * * *